US00RE35401E

United States Patent [19]

Wilson et al.

[11] E Patent Number: Re. 35,401

[45] Reissued Date of Patent: Dec. 17, 1996

[54] SUSPENSION FOR BICYCLES

[75] Inventors: Stephen R. Wilson; Douglas J. Halpin, both of West Linn, Oreg.

[73] Assignee: Halson Designs, Inc., Wilsonville, Oreg.

[21] Appl. No.: 534,616

[22] Filed: Sep. 27, 1995

Related U.S. Patent Documents

Reissue of:

[64] Patent No.: 5,269,549
Issued: Dec. 14, 1993
Appl. No.: 993,793
Filed: Dec. 21, 1992

U.S. Applications:

[63] Continuation-in-part of Ser. No. 909,218, Jul. 6, 1992, Pat. No. 5,238,259, which is a continuation-in-part of Ser. No. 762,576, Sep. 19, 1991, Pat. No. 5,193,832.

[51] Int. Cl.[6] ..... B62K 25/08

[52] U.S. Cl. ..... 280/276; 280/277

[58] Field of Search ..... 280/276, 277, 280/283, 286, 284, 275

[56] References Cited

U.S. PATENT DOCUMENTS

| | | | |
|---|---|---|---|
| 4,037,855 | 7/1977 | Smith | 280/276 |
| 4,561,669 | 12/1985 | Simons | 280/276 |
| 4,971,344 | 11/1990 | Turner | 280/276 |
| 5,088,705 | 2/1992 | Tsai | 280/276 X |
| 5,193,832 | 3/1993 | Wilson et al. | 280/276 |
| 5,193,833 | 3/1993 | Reisinger | 280/276 |
| 5,238,259 | 8/1993 | Wilson et al. | 280/276 |
| 5,284,352 | 2/1994 | Chen | 280/276 |
| 5,310,203 | 5/1994 | Chen | 280/276 |

OTHER PUBLICATIONS

Magazine—Mountain Bike Action/Aug. 1992, Article, pp. 114–116, "How to Change your Manitou Bumpers".

*Primary Examiner*—Joseph D. Pape
*Attorney, Agent, or Firm*—Robert L. Harrington

[57] ABSTRACT

A front wheel shock absorbing system for a bicycle wherein the legs of the front wheel fork include struts slidable in tubes. A cross brace bridges the front wheel and interconnects the struts to insure parallel movement of the struts. Elastomer pads between the tube ends and struts provide spring action. A cap in the tube ends provides access to the pads. A strut protruded from the cap down through a center bore in the pads maintains the pads in alignment. The strut end is flanged and removal of the cap, withdraws the strut and pads which are held onto the strut by the flange end. The flange is configured to permit the elastomer pads to be forced over the flange for replacement of the pads.

7 Claims, 4 Drawing Sheets

SUSPENSION FOR BICYCLES

Matter enclosed in heavy brackets [ ] appears in the original patent but forms no part of this reissue specification; matter printed in italics indicates the additions made by reissue.

BACKGROUND INFORMATION

This is a continuation-in-part of application U.S. Ser. No. 07/909,218 filed on Jul. 6, 1992 now U.S. Pat. No. 5,238,259, which is a continuation-in-part of U.S. Ser. No. 07/762,576 filed on Sep. 19, 1991, now U.S. Pat. No. 5,193,832.

1. Field of the Invention

This invention relates to shock absorbing suspension systems particularly applicable to the front wheel of a bicycle.

2. Background of the Invention

This invention has particular application to bicycles that are referred to as mountain bikes or trail bikes and which are typically ridden over rough terrain. As is typical for all conventional bicycles, the front wheel of the bicycle is the steering wheel. Steering handles, i.e., handlebars, are interconnected to the wheel through a fork, the fork having parallel legs that extend upward from each side of the wheel axle and connect at the top of the wheel to a central steering tube that in turn is attached to the handlebars. The steering tube is rotatably mounted to the frame of the bicycle in a manner to support the frame on the wheel's axle while permitting rotation of the tube and thus turning of the front wheel relative to the frame.

Of concern to the off-road bicycle rider is the jolting of the front wheel as rocks and holes are encountered. This jolting is transferred to the rider through the fork, steering tube and steering handles. Besides the obvious punishment that is inflicted on the rider, there is the added concern for safety. A rider's steering handles are not so easily controlled at the instant of a severe jolt being experienced by the rider through the handles.

To accommodate this front wheel jolting, designers of trail and mountain bikes have developed front wheel, shock absorbing suspension systems.

Shock absorbing systems of the type contemplated herein and which have been successfully used to date have fork legs that include a rigid rod or strut slidable in a rigid sleeve or tube. A biasing member urges the fork's rods to an extended position relative to the fork sleeves. As bumps or holes are encountered by the front wheel, the biasing members collapse as the rods are forced into the sleeve, the biasing members largely absorbing the shock and rapid movement otherwise transferred to the steering handle.

In a preferred form, the rod is attached at one end to the wheel axle and the sleeve is attached to the bicycle frame. (The sleeve is fixedly attached to the steering stem which is rotatably connected to the steering head of the frame,. i.e., the steering stem is considered part of the frame for purposes of describing the present invention.) The biasing member is a multiple of elastomeric pads that are stacked inside the sleeve between a cap at the end of the sleeve and the rod. The advantage of the sleeve being attached to the frame is that the component attached to the frame incurs the greatest stress and the sleeves are the stronger of the two. The advantage of the multiple pads is that the resistance to compression can be varied by interchanging some or all of the pads with pads having greater or less resistance. This is sometimes referred to as fine tuning.

The problems with the above preferred embodiment are twofold. The axle of the front wheel is typically small in cross section and can be flexed under loads. The front wheel may be subjected to such a load as for example when the front wheel is trapped in a rut and the rider attempts to force the wheel to turn out of the rut. The rods of the shock absorber can be twisted out of alignment as the wheel axle bends under such loads. When the rods are twisted, the rods can bind in the sleeves.

There is also the problem with replacing the pads. As a rider travels over different terrain, he may want to change the resistance of the shock absorber. He must take off the caps, remove the pads, (often requiring the bicycle to be turned upside down) and insert the desired pads into the sleeve. In a workshop without time restraints, this is not a problem. In the field where time is a factor, it is a problem.

BRIEF SUMMARY OF THE INVENTION

The shock absorber described above is improved by providing a rigid brace that bridges over the front wheel and is rigidly connected to the two rods. The connections may be provided through a slot in the sleeve or by extending the brace down below the sleeve. The rods are further stabilized by providing upper and lower spaced bearings on the sleeve which prevents the portion of the rod inside the sleeve from bending.

The pads having center holes are mounted on a thin rod or skewer that is attached to the cap. The end of the skewer is flared to a dimension just larger than the center holes of the pad. The flared end is configured to permit the elastomer pads to be forced over the end to enable the rider to readily remove and replace the pads from the skewer. However, the pads will not simply drop off the skewer. Thus, the pads can be mounted on the skewer and the skewer and pads can be slid into the sleeve or removed from the sleeve without concern of the pads dropping off. The rider can thus easily and quickly change the pads in the field.

These and other advantages will become apparent to those skilled in the art with reference to the following detailed description and drawings referred to therein.

DESCRIPTION OF THE PREFERRED EMBODIMENT

Figure 1:
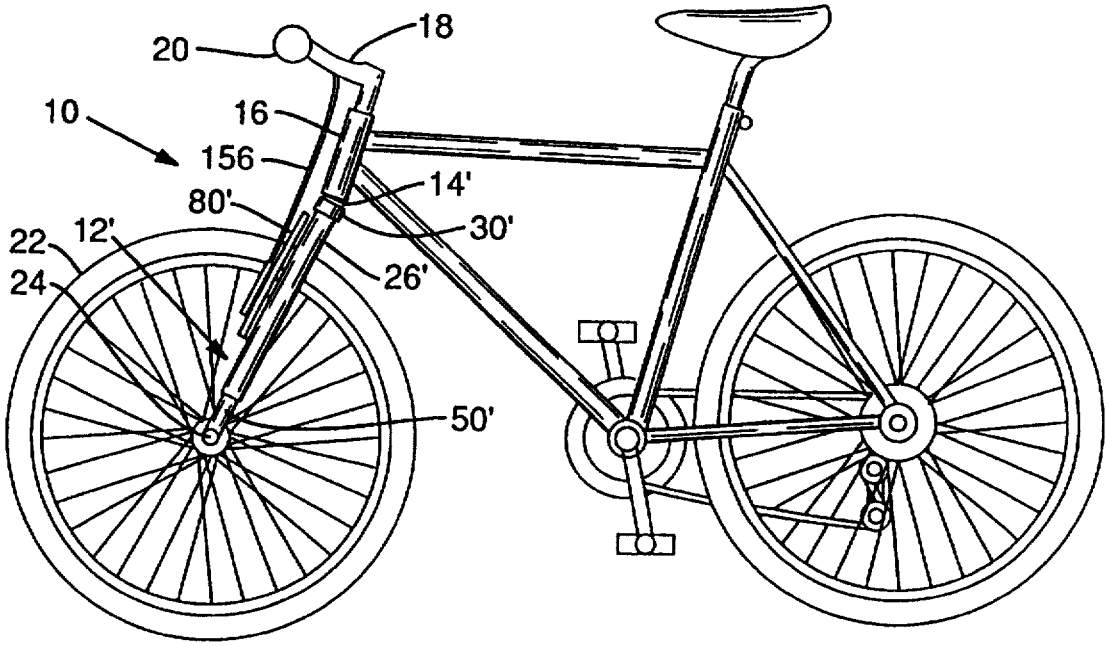
FIG. 1 illustrates a bicycle having a shock absorbing front fork suspension in accordance with the present invention.

Refer now to FIG. of the drawings which illustrates a bicycle 10 suited for traversing off-the-road terrain. The bicycle 10 is typically ridden over rough terrain and obstacles and therefore utilizes a front suspension system in the fork assembly 121 to absorb the shocks. As apparent from FIG. 1, the suspension system 12 in the back assembly is shown connected between the front wheel axle 24 and the steering stem 18 having handle bars 20 which steering stem and handle bus is considered part of the frame as described herein. The steering stem 18 is rotatably mounted in steering head 16. Although not shown, it will be apparent that the suspension system in the fork assembly 12' may also be adapted to mount between the rear wheel and frame of the bicycle 10. The suspension system not only absorbs shocks but improves the riders control capability when encountering typical obstacles of rough terrain such as chuck holes, rocks, steep inclines and the like. The suspension system applied to the front wheel also aids in maintaining the front wheel in contact with the ground for greater steering and braking control of the bicycle 10.

Figure 2:
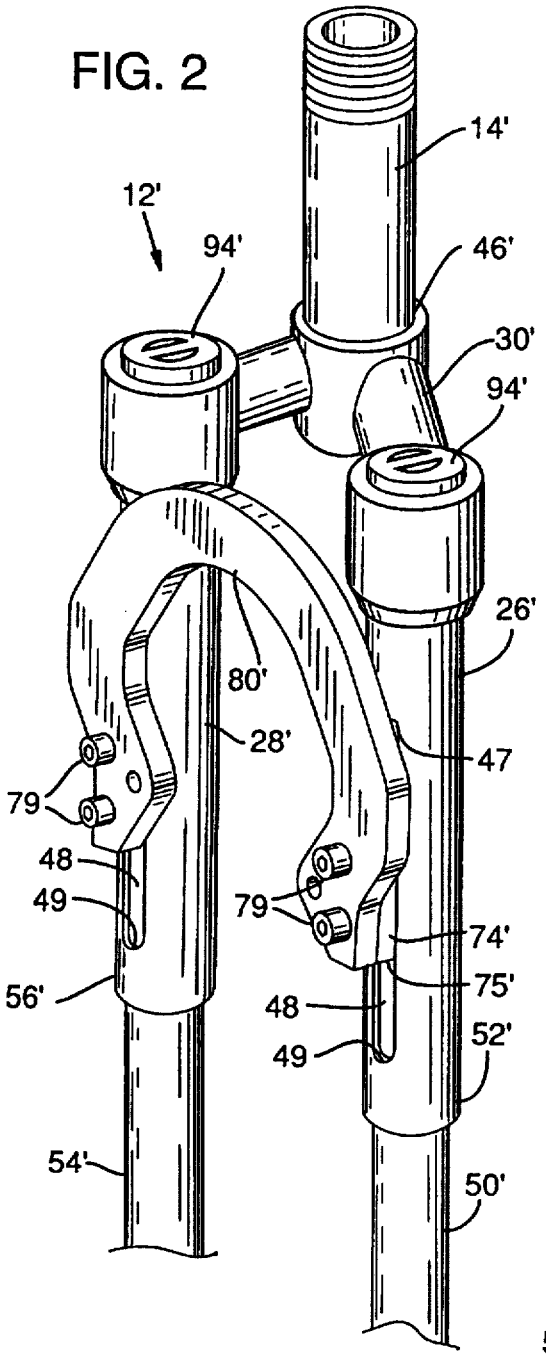
FIG. 2 is a perspective view of a preferred embodiment of a front wheel fork suspension structure as applied to the bicycle of FIG. 1.
Figure 3:
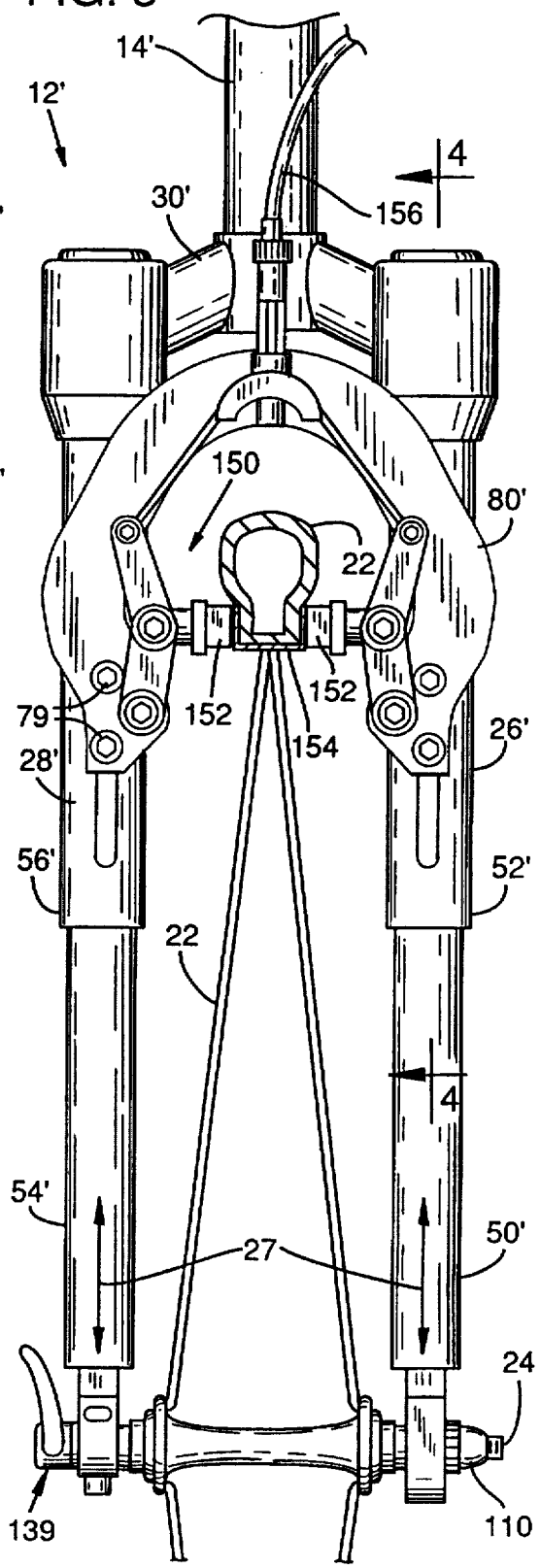
FIG. 3 is a front view of the structure of FIG. 2 but showing a wheel and brake assembly mounted.
Figure 4:
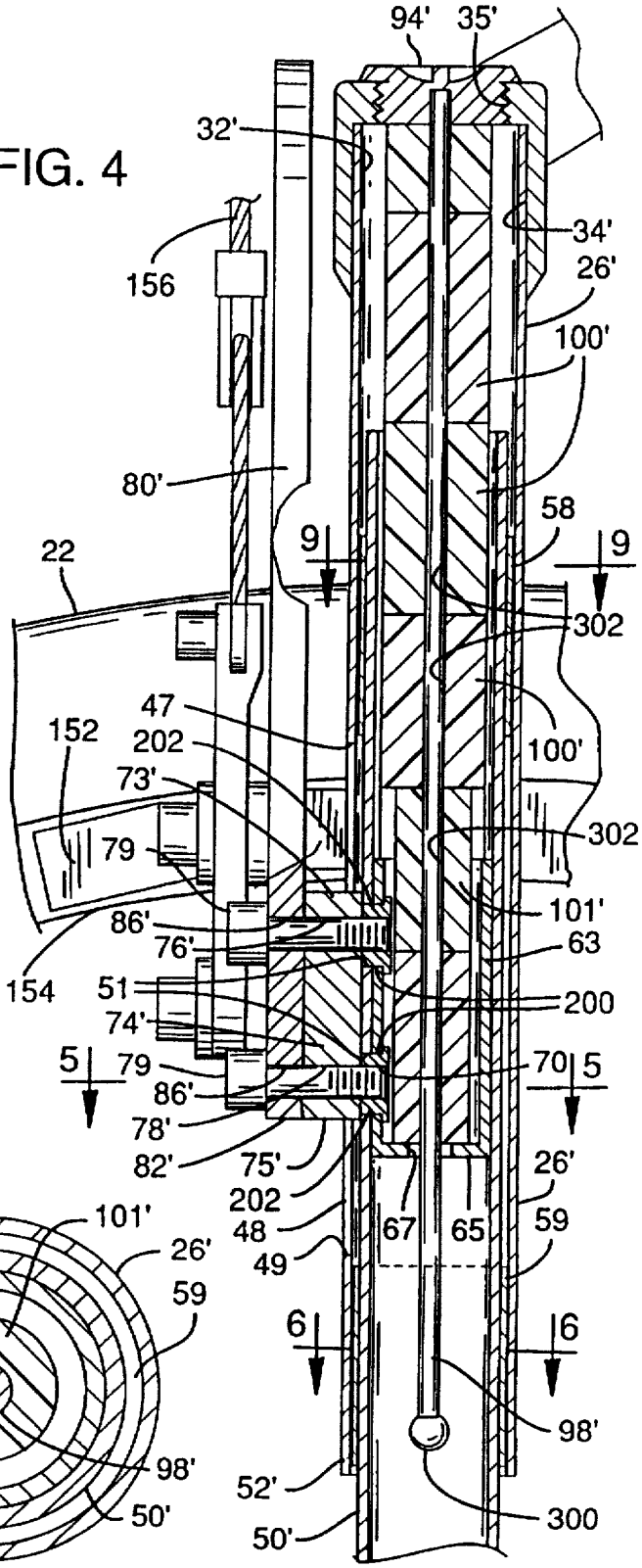
FIG. 4 is a sectional view as viewed on view lines 4—4 of FIG. 3 detailing the structure of the front wheel suspension system.
Figure 6:
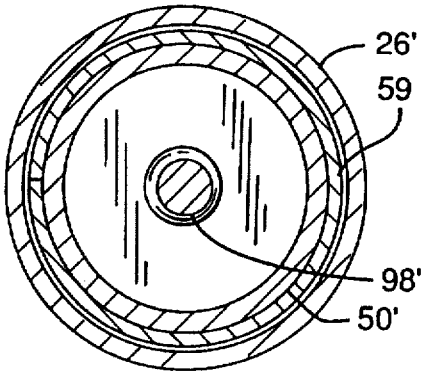
FIG. 6 is a sectional view as viewed on view lines 6—6 of FIG. 4.

Refer now to FIGS. 2, 3 and 4 of the drawings. FIG. 2 is a perspective view of the fork assembly 12,, FIG. 3 is a frontal view showing a brake assembly and tire mounted to the fork assembly 12, and FIG. 4 is a sectional view showing the detail of one side of the fork assembly 12'. The fork assembly 12, as shown in FIG. 2 has an integrally cast triple clamp 30, from which large tubes 26' and 28' extend in a parallel arrangement. Each tube 26', 28' has a longitudinal slot 48 in their side walls. Slidably mounted in the large tubes 26', 28, are struts 50', 54' which are each connected to the cross brace 80' to provide unity of motion. The lower ends of the struts 50', 54' cooperatively form a quick release dropout 139 (FIG. 3) for mounting and demounting the front wheel 22. The steering tube 14' is rigidly fastened in a center bore 46' in the clamp 30'. It will be appreciated that FIG. 4 shows the detail of the large tube 26', the strut 50', the biasing member comprised of an arrangement of bumpers 100' and 101' and related structure. The same is applicable to the large tube 28', the strut 54' and related structure.

The end 32' of the tube 26', as best seen in FIG. 4, is fixedly mounted in bore 34' provided in the triple clamp 30,. The tube 26' is preferably secured in the bore 34' by adhesive bonding. A threaded cap 94', having a rod 98' extending therefrom is threadably installed in a threaded through bore 35' that is provided in the triple clamp 30'.

The strut 50' has apertures 51 in its side wall, the apertures 51 strategically positioned and aligned with the lower end of the strut 50'. A cup 63 is installed in the strut 50'. The cup 63 is in the form of an open ended cylinder and has a through bore 67 in its closed end (base 65). Apertures 200 are provided in the side wall of the cup 63 for receiving threaded inserts 202. The cup 63 is installed and fixedly attached, preferably by gluing, in the strut 50' with the apertures 200 aligned with the apertures 51 in the side wall of the strut 50'. The threaded inserts 202 are installed in the aligned apertures 51, 200 and are secured as by gluing.

The small hollow strut 50' is installed in the tube 26' with the threaded inserts 202 aligned with the slot 48 of the tube 26', the strut 50' being slidably moveable in the tube 26' and extending beyond the end 52' of the tube 26' as shown.

Figure 7:
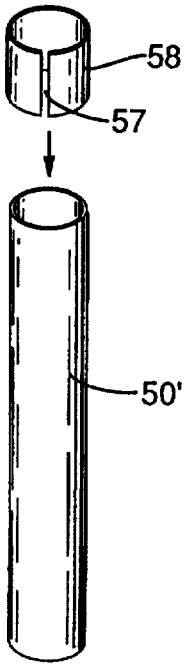
FIG. 7 is an exploded view of a strut and a bushing.
Figure 8:
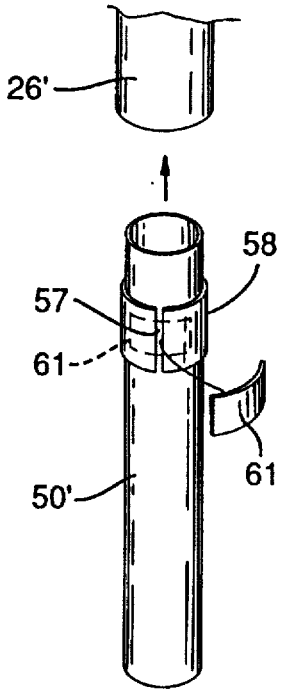
FIG. 8 is view similar to FIG. 7 showing the bushing fitted to the strut.
Figure 9:
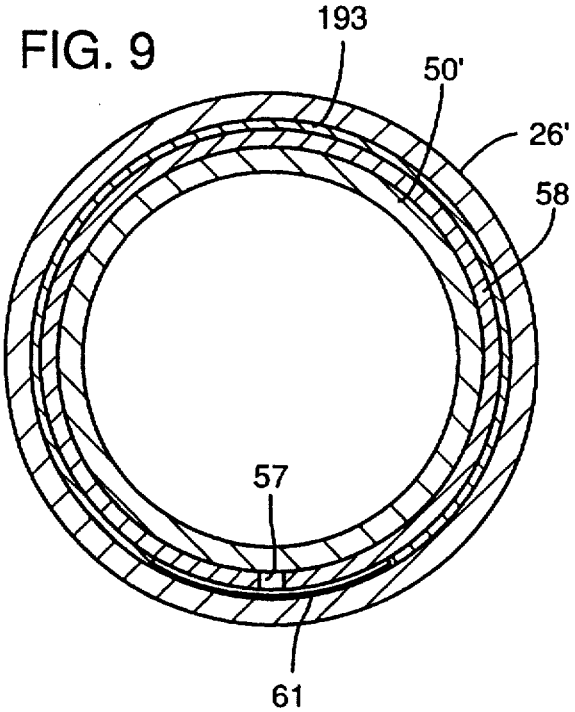
FIG. 9 is a sectional view as viewed on view lines 9—9 of FIG. 4.

The strut 50' is slidably supported in the tube 26' on an upper bearing 58 and a lower bearing 59, such as bushings. The bearings 58 and 59 are custom fit to the strut 50'. Refer now to FIGS. 7 and 8 of the drawings. The bearings 58 and 59 (only 58 being illustrated) have a longitudinal slit 57 extended along their length. The bearing 58 is installed on the strut 50' as shown in FIG. 8 and is clamped by conventional means to conform to the diameter of the strut 50'. The split configuration of the bearing 58 permits this sizing, the bearing 58 of course being closely sized to the strut 50' within normal manufacture tolerances. While in the clamped mode, a foil strip 61 spanning the slit 57 is adhesively bonded to the external surface of the bearing 58 as indicated by the dashed outline. The bearing 59 is custom fit to the strut 50' in the same manner. The bearings 58, 59 are strategically positioned on the strut 50' so that when the strut 50' (with the mounted bearings 58, 59) is inserted into the tube 26', the bearings 58', 59 will be in the proper position for fixedly mounting the bearings 58, 59 within the tube 26'. An adhesive bonding agent 193 (shown in FIG. 9) is utilized to secure the bearings 58, 59 within the tube 26'. The bonding agent 193 is of the type that will fill the void between the external diameter of the bearing 58 (and 59) and the internal diameter of the tube 26' as well as securely bond the bearing 58 (59) in position. The bearing 58 (and 59) are thus custom fit to the external diameter of the strut 50'. Referring again to FIG. 4, the bearings 58 and 59 are shown in the installed position and will support the strut 50' throughout its travel limits.

Referring to FIGS. 2–4, a cross brace 80', being fixedly attached to each strut 50', 54' assures that the struts 50', 54' will move in unison. Additionally the cross brace 80' maintains the struts 50', 54' in a parallel attitude. Whereas the cross brace 80' has a benefit in carrying the rim brake mechanism 150, it is also to be noted that the benefit o assuring parallel unison movement of the struts 50', 54' is applicable to bicycles equipped with disc brakes. The axle 24 is not sufficiently rigid to prevent twisting in off-road conditions as previously explained. The rigid cross brace 80' and the manner in which it is attached to the struts assures that the struts will move in unison and be retained in a precise fixed parallel position.

Figure 5:
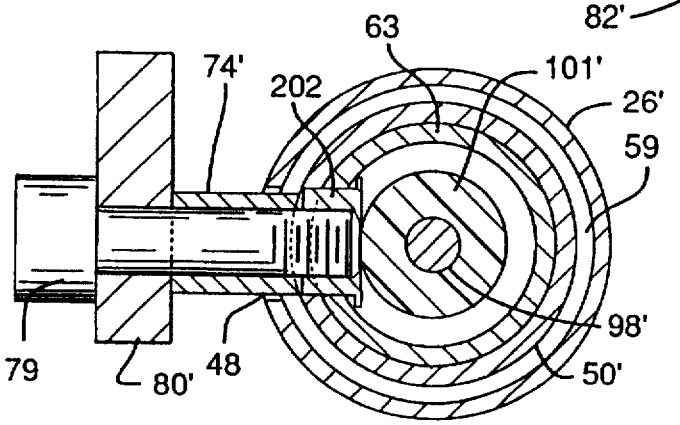
FIG. 5 is a sectional view as viewed on view lines 5—5 of FIG. 4.

An extension bracket 74' limits the travel distance of the strut 50'. As shown in FIGS. 4 and 5, an end 82' of the cross brace 80' and the bracket 74' are affixed to the strut 50' by threaded fasteners 79 extending through bores 86' in the cross brace 80' and bores 78' in the bracket 74' and threadably engaging the threaded inserts 202. The extension bracket 74' extends through the slot 48 of the tube 26' and is seated on the strut 50'. The bracket 74' has a radius of curvature corresponding to the curvature of the external surface of the strut 50' in contact with the strut 50' as shown in FIG. 5. The opposite end 84' of the cross brace 80' and another bracket 74' is fixedly secured to the strut 54' received in the large tube 28' in a like manner. The distance of travel of the struts 50', 54' in the extended condition is limited by the brackets 74' engaging the lower ends 49 of the slots 48 in the tubes 26' and 28'. The retracted condition may be limited by the full compression of the pads 100, 100'. The upper ends 47 of the slots 48 may also be a limiting factor but it is considered preferable to size the length of the strut 54' so that it abuts the upper, closed end of the tube 26' as the limiting factor for the retracted condition.

Still referring to FIGS. 4 and 5, cup 63 has a through bore 67 in its base 65 for receiving a rod 98'. The bore 67 is larger than the diameter of the flanged tip 300 of rod 98' so that the rod 98' can be easily withdrawn through bore 67. Multiple cylindrical elastopolymer bumpers 100' and 101' having center through bores 302 sized to fit on the rod 98' are installed in the tube 26' with the rod 98' received in their center bores 302. As shown, the bumpers 100' and 101' are captive between the cap 94' and the base 65 of the cup 63 fitted in the strut 50'.Note that the bumpers 100', which are larger in diameter than the bumpers 101', are received loosely in upper portion of the strut 50' and the tube 26' and the smaller diameter bumpers 101' are received loosely in the cup 63. The bumpers 101' extend above the cup 63 a sufficient distance to allow for the upward travel distance permitted the strut 50'. The bumpers 100' are smaller in diameter than the internal diameter of the strut 50' (and the tube 26') which permits the bumpers 100' to expand or deform lateraly within the strut 50' and therefore the tube 26'. The bumpers 101' are smaller in diameter than the internal diameter of the cup 63 which permits the bumpers 101' to expand or deform laterally within the cup 63 and the strut 50'. The rod 98' having one end attached to the cap 94' and the opposite end received in the bore 67 in the base 65 of the cup 63 maintain the bumpers 100' and 101' centrally aligned within the tube 26', the strut 50' and the cup 63.

The cylindrical bumpers 100' and 101' are stacked in an end to end arrangement to extend from the underside of the cap 94' to the base 65 of the cup 63 in the small strut 50' when the strut 50' is fully extended out of the tube 26' to its travel limit. The strut 50' is of course limited in its outward travel by the end 75' of the bracket 74' abutting the end 49 of the slot 48.

The bumpers 100' and 101' positioned in the tubes 26', 28' between the caps 94' and the base 65 of the cup 63 fitted in the struts 50', 54' provide the yieldable biasing members to absorb the shocks of impacts. As the struts 50', 54' are forcibly forced into the tubes 26', 28' as a result of the wheel 22 impacting an obstacle for example, the biasing member (i.e., the stacked bumpers 100' and 101') will be subjected to a compressive force. The compressive force will cause the bumpers to yield, mainly by deformation, to permit the struts 50', 54' to enter the tubes 26', 28' with little or no motion imparted to the tubes 26', 28'. Recall that the bumpers 100' are smaller in diameter than the internal diameter of the struts 50', 54' and the bumpers 101' are smaller in diameter than the internal diameter of the cup 63 and therefore may be deformed transverse to their longitudinal axis. The bumpers, being resilient will urge the struts 50', 54' to move outwardly out of the tubes 26', 28' when the wheel has traversed the obstacle and the compressive force of impact has been relieved.

It will be appreciated that various combinations of bumpers 100' and 101' may be utilized to provide a variance in the shock absorbing characteristics of the fork assembly 12'. The user will use combinations of bumpers 100' and 101' or combinations of bumpers 101' of different durometers, of different resilience characteristics and lengths to provide the shock absorbing characteristics suited to the weight of the rider and the conditions under which the bicycle is to be ridden. As previously stated, the bumpers 100' and 101' may be changed to suit by merely removing the cap 94' to gain access to the bumpers for removal and replacement.

Figure 11:
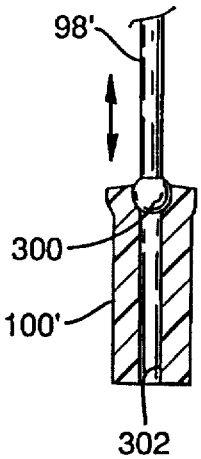
FIG. 11 illustrates the pads being removed from the skewer.

With reference to FIGS. 11 and 12, it will be appreciated that rod (skewer) 98' is withdrawn from tube 26' by removal of cap 94'. Whereas the elastomer pads 100' are sized to fit rod 98', they can slide on the rod as the rod is withdrawn in the upward direction. Unless prevented from sliding off the rod 98', it can happen that they simply come off the end and remain inside the tube 26'. The rider would then likely find it necessary to turn the bike upside down to dump the pads on the ground. This is undesirable particularly where a changeover in the pads is accomplished in the field.

Figure 10:
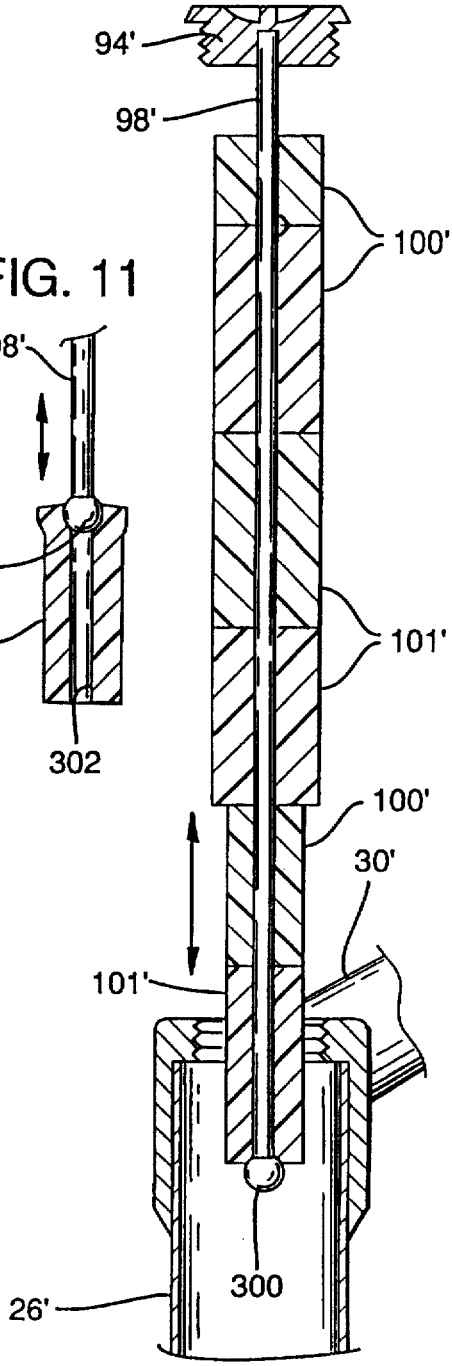
FIG. 10 illustrates the skewered pads being removed from the shock absorber.

The process of removing the pads 100', 101' is greatly simplified by the provision of a flared tip 300 on the end of the rod 98'. The flared tip is configured and sized to resist but not prevent removal and replacement of the pads. FIG. 10 illustrates the cap 94' and rod 98' being withdrawn from the tube 26' and as noted, the pads 100' have slid down the rod until engaged by the tip 300. As shown in FIG. 11, the pads 100' may be removed or replaced from the rod by simply forcing enlargement of the through bores 302. This benefits greatly the rider's ability to quickly remove the pads, survey the pads as arranged on the skewer, and select replacement pads. The pads are then exchanged simply by pulling off and pushing on the pads as illustrated in the figures.

Alternatively, other forms of removal-resistant members may be used. For example, the end of the skewer may be threaded and a nut screwed onto the threads to prevent removal, the nut being removed to permit withdrawal of the pads. Those skilled in the art will recognize that other variations and modifications may be made without departing from the true spirit and scope of the invention. The invention is therefore not to be limited to the illustrations and descriptions set forth but is to be determined by the appended claims.

We claim:

1. In a bicycle, a front wheel fork, shock absorbing suspension system, said bicycle having front and rear wheels supporting a frame adapted to support a rider, the front wheel having an axle and the suspension system extending from the axle to handlebars pivotally mounted on the frame, and which handlebars are rider controlled for turning the front wheel and thereby the direction of the bicycle, said shock absorbing suspension system comprising;

a strut on each side of the front wheel connected to the axle and extended upwardly, a tube slidably surrounding each strut, a member connecting both tubes to the handlebars, and a biasing member between the tubes and the struts whereby upward thrusting of the strut in the tube deforms the biasing member for absorbing the upward thrusting movement, said biasing member urging return downward movement of the strut in the tube, and a rigid cross brace bridging over the front wheel, and connections fixedly connecting said cross brace to said struts, said connections provided to avoid interference with the relative movement of said tubes and to assure that the struts move in unison in a parallel attitude.

2. A front wheel fork, shock absorbing system as defined in claim 1 wherein a slot is provided in each tube and each of said connections extends from said cross brace to one of said struts through one of said slots, each of said connections located in one of said slots to permit relative sliding of said tubes and struts without interference as between said connections and said tubes.

3. In a bicycle having front and rear wheels mounted on a frame, a shock absorbing suspension system for absorbing shock applied to at least one of the bicycle wheels, the wheel having an axle and suspension system extending from the axle to the frame, said chock absorbing suspension system comprising;

a tube, a strut slidable in the tube, at least one elastomer pad between the strut and the tube for resisting sliding movement of the strut into the tube and urging sliding movement of the strut out of the tube, one of said tube and strut fixed to the wheel axle and the other to the frame whereby the pads function as shock absorbers as the wheel encounters rough terrain;

one of said tube and strut having an open end for access to the pads, said pads having through bores, a skewer sized to fit through the through bore and extended through the pads, one end of said skewer being accessible at the open end of one of said tube and strut for removal of the skewer and the pads, said pads being removable from said skewer and replaceable onto said skewer whereby a rider can readily disassemble the suspension system to replace the pads and thereby modify the effective resistance of the pads.

4. A shock absorbing suspension system as defined in claim 3 wherein said one of the bicycle wheels is the front wheel, and the tube and strut are connected between the front wheel and a steering stem portion of the frame for steering the bicycle, said tube having an open end for access to the skewer and pads.

5. A shock absorbing suspension system as defined in claim 3 wherein multiple pads are provided on said skewer and one end of said skewer is adapted for sliding removal of said pads off of said one end, and a member provided on said one end that resists sliding removal of said pads whereby withdrawal of the skewer from the open end also withdraws the pads.

6. A shock absorbing suspension system as defined in claim 5 wherein said member is a flared end portion of the skewer having a cross sectional dimension that is larger than the through bores through the pads, said flared end configured and sized relative to the through bores of the pads to permit forced removal and placement of the pads off of and onto the skewer over the flared end portion.

*7. In a bicycle having front and rear wheels mounted on a frame, a shock absorbing suspension system for absorbing shock applied to at least one of the bicycle wheels, the wheel having an axle and suspension system extending from the axle to the frame, said shock absorbing suspension system comprising;*

*a tube, a strut slidable in the tube, a plurality of elastomer pads between the strut and the tube for resisting sliding movement of the strut into the tube and urging sliding movement of the strut out of the tube, one of said tube and strut fixed to the wheel axle and the other to the frame whereby the pads function as shock absorbers as the wheel encounters rough terrain;*

*one of said tube and strut having an open end, said pads arranged in a stack and a retention structure retaining the pads in a stacked arrangement to provide a unitized assembly of pads having a top and bottom, one of said top and bottom of the stack accessible through the open end whereby the assembly of pads can be withdrawn through the open end as a unitized assembly.*

* * * * *